(12) United States Patent
Iwanami et al.

(10) Patent No.: US 9,625,755 B2
(45) Date of Patent: Apr. 18, 2017

(54) LIQUID CRYSTAL DISPLAY

(71) Applicant: ORTUS TECHNOLOGY CO., LTD., Tokyo (JP)

(72) Inventors: Norishige Iwanami, Hachioji (JP); Shinichi Shimomaki, Akishima (JP); Jiro Takei, Hachioji (JP); Masamichi Komaki, Akishima (JP); Yasushi Nakajima, Hachioji (JP)

(73) Assignee: ORTUS TECHNOLOGY CO., LTD., Tokyo (JP)

( * ) Notice: Subject to any disclaimer, the term of this patent is extended or adjusted under 35 U.S.C. 154(b) by 477 days.

(21) Appl. No.: 13/964,605

(22) Filed: Aug. 12, 2013

(65) Prior Publication Data

US 2013/0329167 A1 Dec. 12, 2013

Related U.S. Application Data

(63) Continuation of application No. PCT/JP2012/053298, filed on Feb. 13, 2012.

(30) Foreign Application Priority Data

Feb. 14, 2011 (JP) ................................. 2011-028554

(51) Int. Cl.
  *G02F 1/1343* (2006.01)
  *G02F 1/1347* (2006.01)
  (Continued)

(52) U.S. Cl.
  CPC ........ *G02F 1/1334* (2013.01); *G02F 1/13476* (2013.01); *G02F 1/134327* (2013.01);
  (Continued)

(58) Field of Classification Search
  CPC ............. G02F 1/1334; G02F 1/134309; G02F 1/134354; G02F 1/134345; G02F 1/13624;
  (Continued)

(56) References Cited

U.S. PATENT DOCUMENTS 5,122,888 A * 6/1992 Iizuka ............... G02F 1/134309
  349/138
5,680,190 A 10/1997 Michibayashi et al.
  (Continued)

FOREIGN PATENT DOCUMENTS

CN 100447641 12/2008
CN 100476554 4/2009
  (Continued)

OTHER PUBLICATIONS

Definition of term "substrate." The American Heritage Dictionary of the English Language, Fifth edition, copyright 2015 by Houghton Mifflin Harcourt Publishing Company. Defnition downloaded from https://ahdictionary.com/word/search.html?q=substrate on Jul. 12, 2016.*
  (Continued)

*Primary Examiner* — Michael Caley
*Assistant Examiner* — Angela Davison

(57) ABSTRACT

A liquid crystal display includes a first substrate and a second substrate, a lower display electrode provided on the first substrate, an insulating layer provided on the lower display electrode, an upper display electrode provided on the insulating layer and having a mesh pattern including opening portions, a common electrode provided on the second substrate, and a polymer-dispersed liquid crystal layer sandwiched between the first substrate and the second substrate in a state in which the upper display electrode and the common electrode face each other.

15 Claims, 12 Drawing Sheets

(51) Int. Cl.
*G02F 1/1334* (2006.01)
*G02F 1/1362* (2006.01)
*G03B 13/02* (2006.01)
*G03B 17/20* (2006.01)

(52) U.S. Cl.
CPC ............... *G02F 1/134309* (2013.01); *G02F 2001/13345* (2013.01); *G02F 2001/13629* (2013.01); *G02F 2001/136236* (2013.01); *G02F 2201/122* (2013.01); *G02F 2201/123* (2013.01); *G02F 2203/30* (2013.01); *G02F 2203/60* (2013.01); *G03B 13/02* (2013.01); *G03B 17/20* (2013.01)

(58) Field of Classification Search
CPC ..... G02F 1/134327; G02F 2001/13345; G02F 2001/13629; G02F 2001/134345; G02F 2201/122; G02F 2201/123; G02F 2203/30; G02F 2203/60; G03B 17/20; G03B 13/02; G03B 13/04; G03B 2213/00; G03B 2213/02; G09G 3/3614; G09G 2300/0876
USPC ... 349/48, 85, 86, 142, 147, 183, 37–39, 88; 396/296; 257/306–309; 345/79, 96, 209
See application file for complete search history.

(56) References Cited

U.S. PATENT DOCUMENTS

| | | | |
|---|---|---|---|
| 2003/0146891 | A1 | 8/2003 | Poliakine |
| 2004/0165136 | A1* | 8/2004 | Sugiyama ......... G02F 1/133707 349/143 |
| 2006/0012741 | A1 | 1/2006 | Mizusako |
| 2006/0044501 | A1 | 3/2006 | Mizusako |
| 2009/0310076 | A1* | 12/2009 | Hsieh ................ G02F 1/134309 349/144 |
| 2010/0265442 | A1* | 10/2010 | Sasabayashi ..... G02F 1/133707 349/129 |
| 2011/0199528 | A1 | 8/2011 | Shimomaki et al. |
| 2011/0285940 | A1 | 11/2011 | Kubota et al. |

FOREIGN PATENT DOCUMENTS

| | | |
|---|---|---|
| JP | 58-102211 | 6/1983 |
| JP | 2-17717 | 2/1990 |
| JP | 2000-19583 | 1/2000 |
| JP | 2001-201755 | 7/2001 |
| JP | 2003-533751 | 11/2003 |
| JP | 2011-186435 | 9/2011 |
| JP | 2012-3250 | 1/2012 |
| TW | 200951590 | 12/2009 |

OTHER PUBLICATIONS

Extended European Search Report dated Jul. 2, 2014 in corresponding European Patent Application No. 12747076.3.
PCT International Preliminary Report on Patentability mailed Aug. 29, 2013 in corresponding International Application No. PCT/JP2012/053298.
International Search Report mailed Apr. 24, 2012 in corresponding International Application No. PCT/JP2012/053298.
Chinese Office Action dated Jun. 3, 2015 in corresponding Chinese Patent Application No. 201280008846.9.
Japanese Office Action dated Dec. 15, 2015 in corresponding Japanese Patent Application No. 2012-557956.
European Communication dated Mar. 4, 2016 from corresponding European Patent Application No. 12747076.3, 6 pages.

* cited by examiner

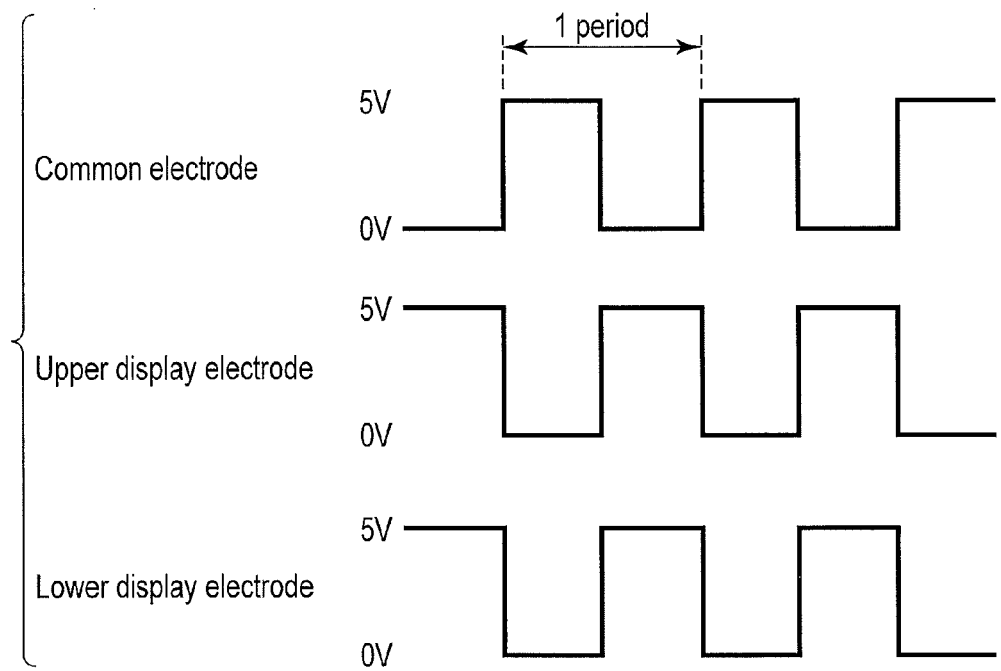
F I G. 5
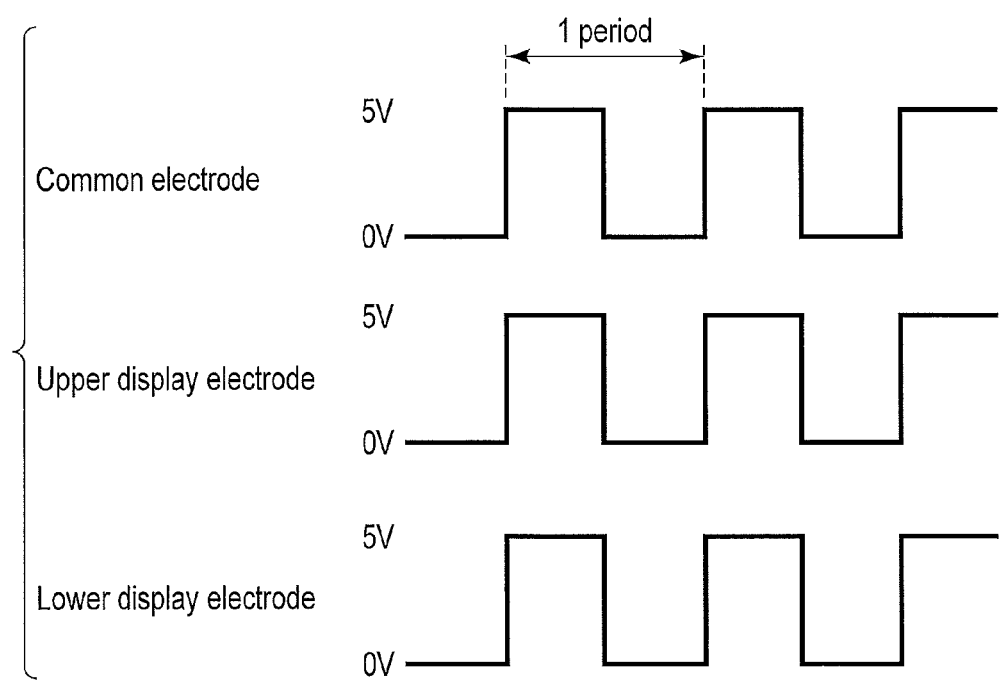
F I G. 6

| Diameter of opening portion (μm) | 5 | 8 | 12 | 24 | 50 | 100 | 200 | 300 |
|---|---|---|---|---|---|---|---|---|
| Scattering appearance | ←――――――― Even ―――――――→ | | | | | ←― Dots are visible ―→ | | |

F I G. 11

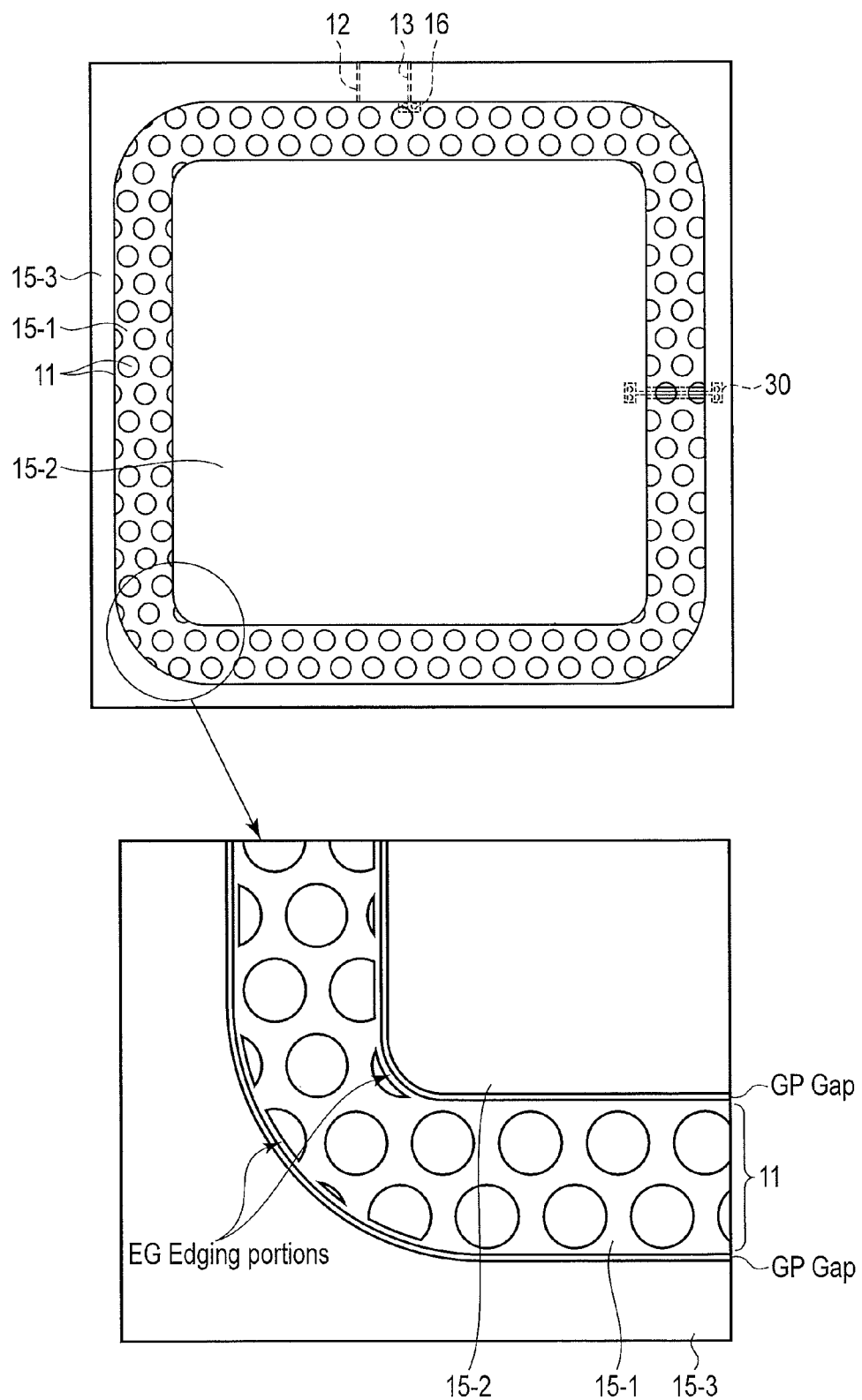
F I G. 12

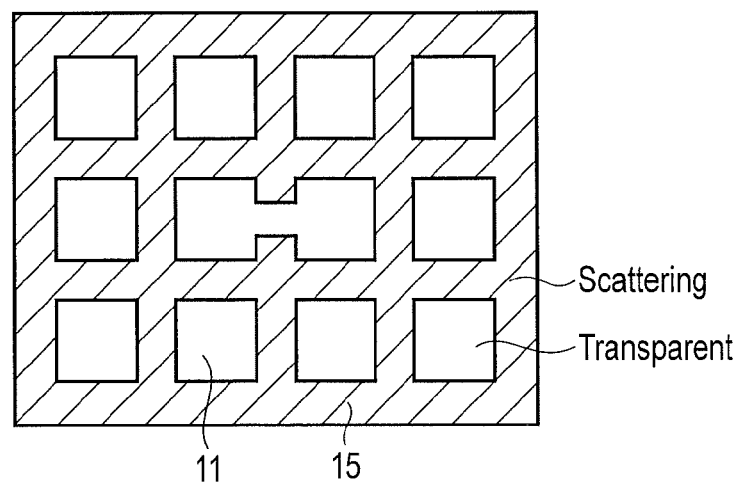
F I G. 17
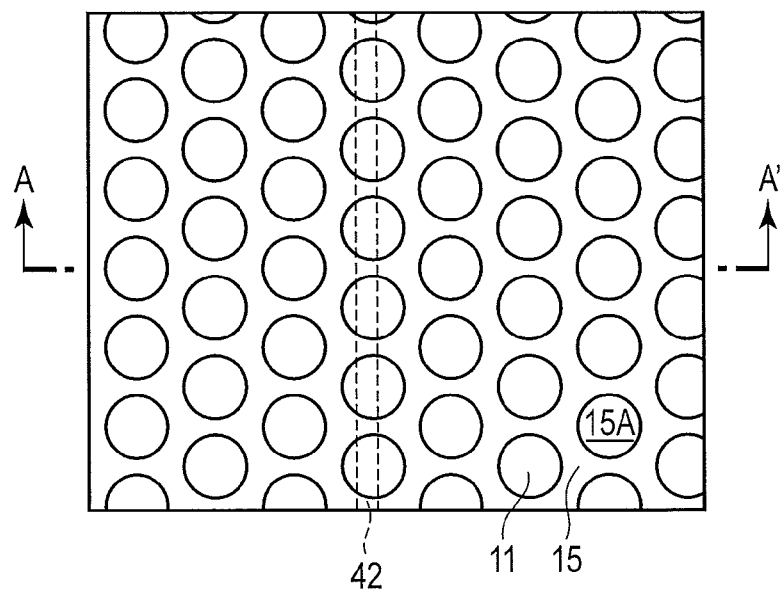
F I G. 18

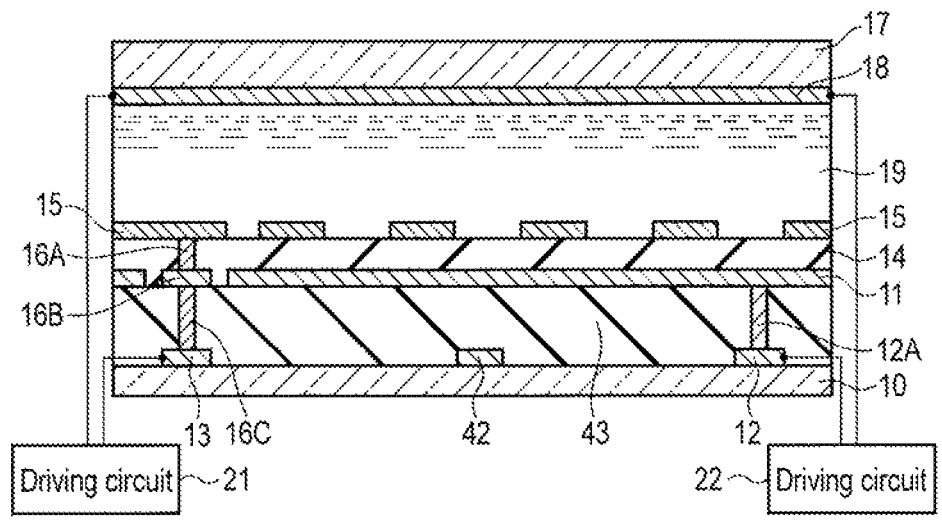
F I G. 19

LIQUID CRYSTAL DISPLAY

CROSS REFERENCE TO RELATED APPLICATIONS

This application is a Continuation Application of PCT Application No. PCT/JP2012/053298, filed Feb. 13, 2012 and based upon and claiming the benefit of priority from prior Japanese Patent Application No. 2011-028554, filed Feb. 14, 2011, the entire contents of all of which are incorporated herein by reference.

BACKGROUND OF THE INVENTION

1. Field of the Invention

The present invention relates to a liquid crystal display and, more particularly, to a liquid crystal display using a polymer dispersed liquid crystal (PDLC).

2. Description of the Related Art

The polymer-dispersed liquid crystal has a structure in which the liquid crystal is phase-separated in a polymer formed into a three-dimensional network (polymer network), and creates a light scattering state and a light transmission state by a state in which the liquid crystal molecules are arranged at random along the side walls of the polymer network and a state in which an electric field is applied to align the liquid crystal molecules in the direction of the electric field, respectively (for example, Jpn. Pat. Appln. KOKAI Publication No. 2000-19583). The degree of scattering is decided by the voltage applied to the liquid crystal. The voltage applied to the liquid crystal is decided by voltage division between the polymer material and the liquid crystal.

FIG. 20 is a sectional view showing an example of a conventional liquid crystal display. A transparent display electrode 102 is formed on one glass substrate 101. A transparent common electrode 104 is formed on the other glass substrate 103. The region where the display electrode 102 is formed is a region capable of displaying a pattern. The above-described two glass substrates 101 and 103 sandwich a polymer-dispersed liquid crystal layer 105. A seal member 106 bonds the two glass substrates 101 and 103 so as to seal the polymer-dispersed liquid crystal layer 105. The liquid crystal display shown in FIG. 20 displays a pattern by applying a voltage between the display electrode 102 and the common electrode 104. For example, when a voltage of 5 V is applied between the display electrode 102 and the common electrode 104, a transparent state is obtained. When the voltage between the display electrode 102 and the common electrode 104 is reduced to zero, a scattering state is obtained.

FIG. 21 is a graph showing the relationship between the voltage and the transmittance replacing the degree of scattering at a plurality of temperatures (for example, −10, 25, and 50° C.) As can be understood from FIG. 21, the transmittance at the same voltage largely changes depending on the temperature. The reason for this is as follows. When the temperature is high, the dielectric constant of the liquid crystal is small. Conversely, when the temperature is low, the dielectric constant is large. However, the dielectric constant of the polymer material changes little if the temperature difference is several tens of degrees centigrade. Since the effective voltage actually applied to the liquid crystal is divided by the polymer material, the effective voltage is high at a high temperature and low at a low temperature. For this reason, the characteristic of the liquid crystal display using the polymer-dispersed liquid crystal largely changes depending on the temperature, as shown in FIG. 21.

When performing binary display of scattering (0 V) and transmission (5 V), a change in the temperature does not influence the display. However, when expressing halftone by the voltage, the transmittance largely changes depending on the temperature. For example, when the voltage is 2.2 V, the transmittances are 50% at 25° C., 86% at 50° C., and 5% at −10° C. The halftone cannot be expressed at 50 and −10° C., and display equivalent to binary display is only performed.

In addition, Jpn. PCT National Publication No. 2003-533751 discloses a technique of displaying halftone by dithering.

BRIEF SUMMARY OF THE INVENTION

According to an aspect of the present invention, there is provided a liquid crystal display comprising: a first substrate and a second substrate; a lower display electrode provided on the first substrate; an insulating layer provided on the lower display electrode; an upper display electrode provided on the insulating layer and having a mesh pattern including opening portions; a common electrode provided on the second substrate; and a polymer-dispersed liquid crystal layer sandwiched between the first substrate and the second substrate in a state in which the upper display electrode and the common electrode face each other.

According to an aspect of the present invention, there is provided a liquid crystal display comprising: a first substrate and a second substrate; a first lower display electrode and a second lower display electrode provided on the first substrate and configured to display a first character; a first interconnection provided on the first substrate and between the first lower display electrode and the second lower display electrode and configured to display a second character; an insulating layer provided on the first lower display electrode and the second lower display electrode; an upper display electrode provided on the insulating layer and having a mesh pattern including opening portions; a second interconnection provided on the insulating layer to cross the first interconnection; a first contact provided in the insulating layer to electrically connect the first lower display electrode and the second interconnection; a second contact provided in the insulating layer to electrically connect the second lower display electrode and the second interconnection; a common electrode provided on a surface of the second substrate facing the first substrate; and a polymer-dispersed liquid crystal layer sandwiched between the first substrate and the second substrate in a state in which the upper display electrode and the common electrode face each other.

According to an aspect of the present invention, there is provided a liquid crystal display comprising: a first substrate and a second substrate; an interconnection provided on the first substrate and configured to display a first character; a first insulating layer provided on the interconnection; a lower display electrode provided on the first insulating layer and configured to display a second character; a second insulating layer provided on the lower display electrode; an upper display electrode provided on the second insulating layer and having a mesh pattern including opening portions; a common electrode provided on the second substrate; and a polymer-dispersed liquid crystal layer sandwiched between the first substrate and the second substrate in a state in which the upper display electrode and the common electrode face each other.

BRIEF DESCRIPTION OF THE SEVERAL VIEWS OF THE DRAWING

FIG. 5 is a timing chart showing voltage waveforms in the transparent state of the polymer-dispersed liquid crystal layer;

FIG. 6 is a timing chart showing voltage waveforms in the scattering state of the polymer-dispersed liquid crystal layer;

FIG. 11 is a view for explaining the relationship between the scattering appearance and the diameter of the opening portion of the upper display electrode;

FIG. 12 is a plan view showing one extracted character pattern;

FIG. 17 is a schematic view showing the display state of the liquid crystal display shown in FIG. 15;

FIG. 18 is a plan view showing the arrangement of a liquid crystal display according to the third embodiment;

FIG. 19 is a sectional view showing the arrangement of the liquid crystal display taken along line A-A' in FIG. 18;

DETAILED DESCRIPTION OF THE INVENTION

Figure 1:
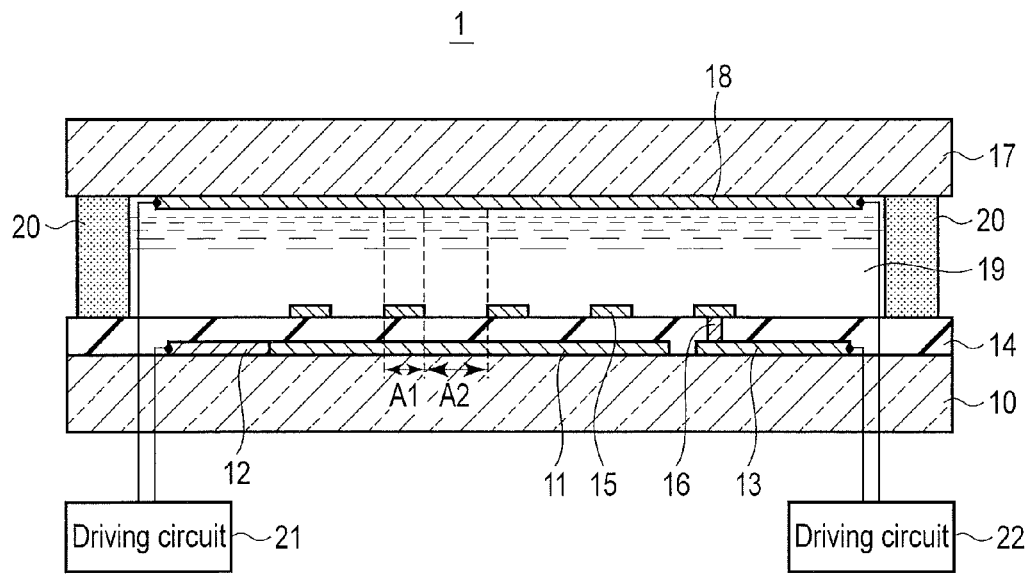
FIG. 1 is a sectional view showing the arrangement of a liquid crystal display according to the first embodiment.

The embodiments of the present invention will be described below with reference to the accompanying drawings. Note that the drawings are schematic and conceptual, and the dimensions, ratios, and the like in the respective drawings are not necessary the same as those in reality. In addition, even the same portion may be shown in a different dimensional relationship or with different ratios in different drawings. Several embodiments to be described below represent examples of apparatuses and methods for embodying the technical idea of the present invention, and the technical idea of the present invention is not specified by the shapes, structures, and layouts of the constituent parts. The technical idea of the present invention can be embodied by modifying constituent elements without departing from the gist of the invention. Note that in the following explanation, the same reference numerals denote elements having the same functions and arrangements, and a repetitive explanation will be made only when necessary.

First Embodiment

FIG. 1 is a sectional view showing the arrangement of a liquid crystal display 1 according to the first embodiment of the present invention. The liquid crystal display 1 according to this embodiment is a pattern display type liquid crystal display that displays a plurality of characters such as letters and graphic patterns.

A lower display electrode 11, a lower interconnection electrode 12 electrically connected to the lower display electrode 11, and an upper interconnection electrode 13 are provided on the upper surface (liquid crystal-side surface) of a substrate 10. An insulating layer 14 is provided on the upper surface of the substrate 10 so as to cover the lower display electrode 11, the lower interconnection electrode 12, and the upper interconnection electrode 13. An upper display electrode 15 is provided on the insulating layer 14. One terminal of the upper display electrode 15 is electrically connected to the upper interconnection electrode 13 by a contact plug 16 passing through the insulating layer 14. The lower interconnection electrode 12 and the upper interconnection electrode 13 are used as interconnections to supply voltages to the lower display electrode 11 and the upper display electrode 15, respectively. The lower display electrode 11 and the upper display electrode 15 have the same shape (outer shape). The lower display electrode 11 and the upper display electrode 15 are processed into a character pattern so that the character can be displayed.

A common electrode 18 is provided on the bottom surface (liquid crystal-side surface) of a substrate 17. The upper surface (surface on the opposite side of the liquid-crystal side surface) of the substrate 17 serves as the image display surface of the liquid crystal display 1. Both the substrates 10 and 17 are transparent substrates made of glass, silica, a plastic, or the like. All of the lower display electrode 11, the lower interconnection electrode 12, the upper interconnection electrode 13, the upper display electrode 15, the contact plug 16, and the common electrode 18 are formed from transparent electrodes and made of, for example, indium tin oxide (ITO). Each of the lower display electrode 11, the upper display electrode 15, and the common electrode 18 has a film thickness of, for example, about 25 nm. As the insulating layer 14, for example, silicon nitride is used. The film thickness of the insulating layer 14 is about 500 nm.

A polymer-dispersed liquid crystal layer 19 is provided between the substrate 10 and the substrate 17. More specifically, the polymer-dispersed liquid crystal layer 19 is sandwiched between the substrate 10 and the substrate 17 which are arranged so as to make the upper display electrode 15 and the common electrode 18 face each other. The polymer-dispersed liquid crystal layer 19 is sealed between the substrate 10 and the substrate 17 by a seal member 20. The seal member 20 bonds the substrate 10 and the substrate 17. The thickness (gap) of the polymer-dispersed liquid crystal layer 19 is, for example, about 7 µm.

The polymer-dispersed liquid crystal layer 19 is formed by a method of, for example, sealing a solution mixture of a nematic liquid crystal having a positive dielectric anisotropy and a polymer material that causes a photopolymerization between the substrates and photopolymerizing the polymer material in the solution mixture by light irradiation to phase-separate the polymer and the liquid crystal. Hence, the polymer-dispersed liquid crystal layer 19 has a structure in which the liquid crystal is phase-separated in the polymer formed into a three-dimensional network (polymer network).

Note that the sectional view of FIG. 1 extracts the elements used to display one character. In fact, the lower display electrode 11, the lower interconnection electrode 12, the upper display electrode 15, and the upper interconnection electrode 13 are provided for each character. On the other hand, the one common electrode 18 is commonly provided for all characters. Hence, the size of the common electrode 18 is almost equal to that of the screen of the liquid crystal display 1.

Figure 2:
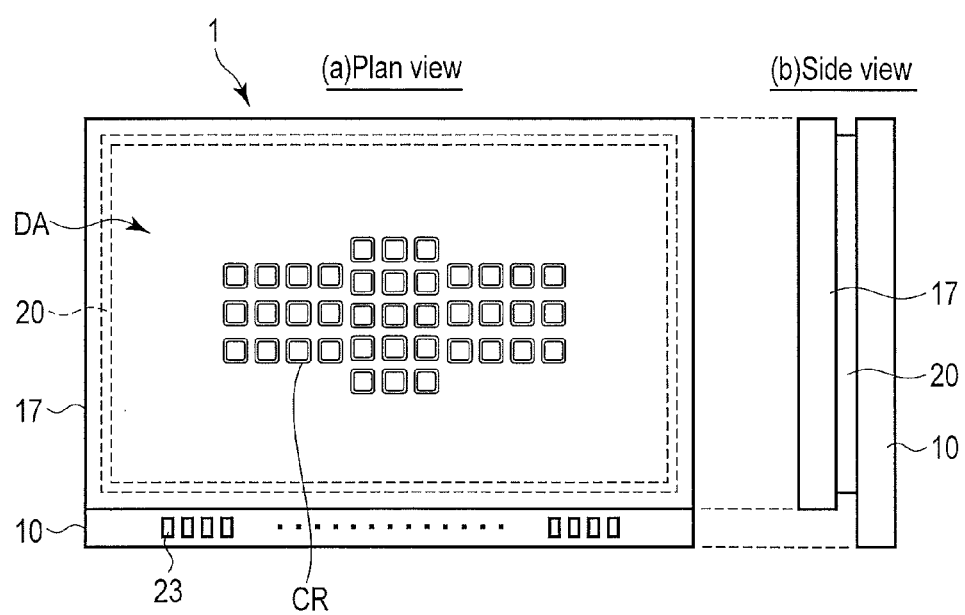
FIG. 2 shows schematic views of an example of characters displayable by the liquid crystal display.

FIG. 2 shows schematic views of an example of characters CR displayable by the liquid crystal display 1. In FIG. 2, (a) is a plan view, and (b) is a side view. The region surrounded by the seal member 20 serves as a display region DA of the liquid crystal display 1. The polymer-dispersed liquid crystal layer 19 is provided in the display region DA. The common electrode 18 has a size equal to or larger than that of the display region DA. A plurality of square patterns in the display region DA are the plurality of characters CR displayable by the liquid crystal display 1. The plurality of characters CR shown in (a) of FIG. 2 represent a focus point displayed on the viewfinder of a camera or the like. The lower display electrode 11 and the upper display electrode 15 are processed into the same shape as the pattern of the character CR. The lower interconnection electrode 12, the upper interconnection electrode 13, and the common electrode 18 are led to terminals 23. The plurality of terminals 23 are electrically connected to driving circuits 21 and 22. As the pattern of the character CR, various graphic patterns and letters are usable in addition to the square.

Figure 3:
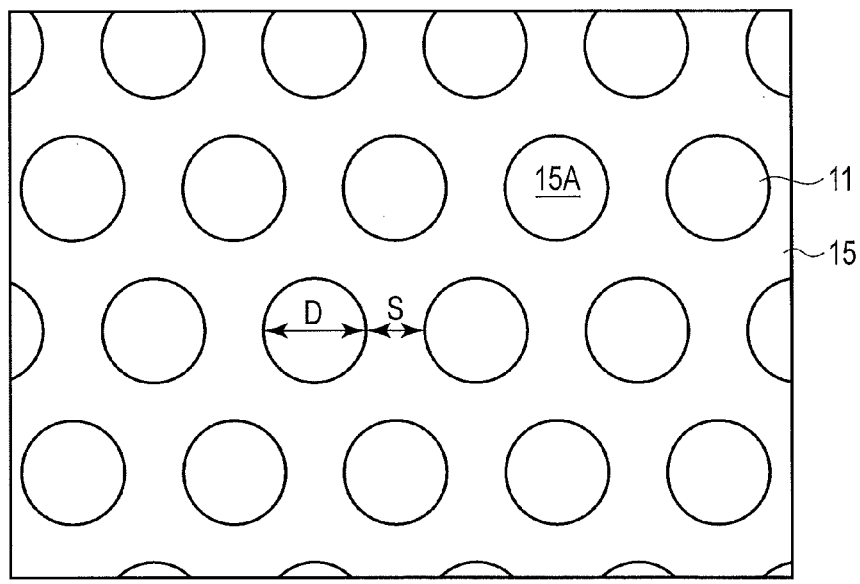
FIG. 3 is a plan view for explaining the shape of an upper display electrode.

FIG. 3 is a plan view for explaining the shape of the upper display electrode 15. The upper display electrode 15 has a mesh pattern (reticular pattern) including a plurality of opening portions 15A. The opening portion 15A can have a circular shape, as shown in FIG. 3, or an elliptical shape, a rectangular shape, or any other polygonal shape. Note that since the lower interconnection electrode 12 and the upper display electrode 15 have the same shape, as described above, the lower display electrode 11 is always provided under the opening portions 15A. A diameter D of the opening portion 15A is, for example, about 50 μm, and a distance S between the opening portions is, for example, about 18 μm.

In this embodiment, halftone is displayed by dithering between a first region A1 where the upper display electrode 15 and the common electrode 18 directly face each other and a second region A2 where the lower display electrode 11 and the common electrode 18 directly face each other (that is, the region of the opening portion 15A of the upper display electrode 15). Hence, to obtain uniform halftone display, the opening portions 15A formed in the upper display electrode 15 are preferably evenly arranged. In this embodiment, the opening portions 15A formed in the upper display electrode 15 have a staggered arrangement. The staggered arrangement is a pattern in which the plurality of opening portions are arranged such that each opening portion of a next row is arranged at a position ½ the distance between two adjacent opening portions or the distance (called a pitch) between the centers of two adjacent opening portions. When the staggered arrangement is used as the pattern of the opening portions 15A formed in the upper display electrode 15, unevenness in the halftone display by dithering can be prevented.

For example, if the refractive index difference between the insulating layer 14 and the lower display electrode 11 is large, the lower display electrode 11 may be visible from the screen. To prevent this, the refractive index difference between the insulating layer 14 and the lower display electrode 11 is preferably smaller and, more specifically, 0.25 or less. For the same reason, the refractive index difference between the insulating layer 14 and the upper display electrode 15 is preferably 0.25 or less. The lower display electrode 11 and the upper display electrode 15 can be prevented from being visible from the screen by satisfying the refractive index condition.

(Operation)

The operation of the liquid crystal display 1 will be described next. The image display operation of the liquid crystal display 1 is controlled by the driving circuits 21 and 22. The driving circuit 21 is electrically connected to the lower interconnection electrode 12 and the common electrode 18 and applies voltages of two levels (two values) between them. The driving circuit 22 is electrically connected to the upper interconnection electrode 13 and the common electrode 18 and applies voltages of two levels (two values) between them. This makes it possible to independently control the voltages for the lower display electrode 11 connected to the lower interconnection electrode 12 and the upper display electrode 15 connected to the upper interconnection electrode 13.

Figure 4:
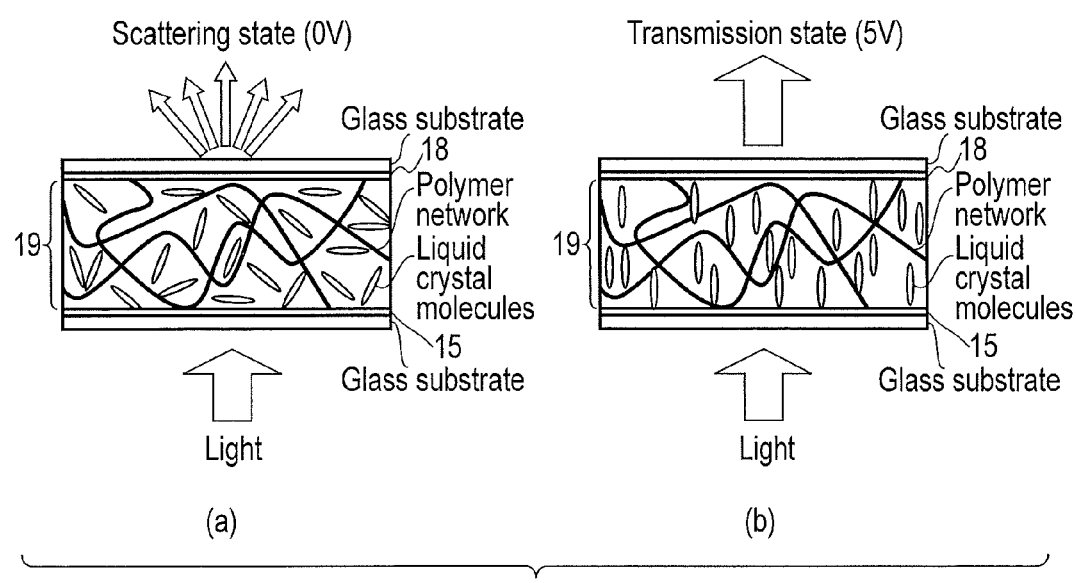
FIG. 4 shows schematic views for explaining the state of a polymer-dispersed liquid crystal layer at the time of voltage control.

FIG. 4 shows schematic views for explaining the state of the polymer-dispersed liquid crystal layer 19 at the time of voltage control. In FIG. 4, (a) is a view for explaining the scattering state of the polymer-dispersed liquid crystal layer 19. In FIG. 4, (b) is a view for explaining the transmission state of the polymer-dispersed liquid crystal layer 19. Note that FIG. 4 extracts part of the polymer-dispersed liquid crystal layer 19 sandwiched between the common electrode 18 and the upper display electrode 15.

When no voltage is applied to the polymer-dispersed liquid crystal layer 19 (the voltage is set to zero), no electric field is applied to the liquid crystal molecules, and the liquid crystal molecules are arranged at random. For this reason, when white light enters, the incident light scatters, and a white turbidity state is externally observed. On the other hand, when a high voltage (for example, 5 V) is applied to the polymer-dispersed liquid crystal layer 19, the liquid crystal molecules are aligned in the direction of the electric field. Hence, the incident light is transmitted, and a transparent state is externally observed.

In this embodiment, the lower display electrode 11 exists under the opening portions 15A of the upper display electrode 15. It is therefore possible to independently control the state of the polymer-dispersed liquid crystal layer 19 in the first region A1 where the upper display electrode 15 and the common electrode 18 directly face each other and the state of the polymer-dispersed liquid crystal layer 19 in the second region A2 where the lower display electrode 11 and the common electrode 18 directly face each other. Hence, when displaying one character, four display states, that is, transparent, halftone (weak scattering 1 and weak scattering 2), and scattering states can be obtained by dithering between the first region A1 and the second region A2.

FIG. 5 shows voltage waveforms in the transparent state. In the transparent state, the driving circuit 22 applies a voltage of 5 V between the upper display electrode 15 and the common electrode 18. The driving circuit 21 applies a voltage of 5 V between the lower display electrode 11 and the common electrode 18. Since the voltage of 5 V is applied to the entire character pattern, the entire character pattern can be set in the transparent state. Note that if a DC voltage is continuously applied to the liquid crystal, the liquid crystal degrades. To prevent this, reverse driving that reverses the polarity of the voltage every predetermined time is employed. The period of reverse driving can appropriately be designed depending on the liquid crystal material or the like, and is set to, for example, 1/30 s in this embodiment.

FIG. 6 shows voltage waveforms in the scattering state. In the scattering state, the driving circuit 22 sets the voltage between the upper display electrode 15 and the common electrode 18 to zero, that is, sets the upper display electrode 15 and the common electrode 18 to an equipotential. The driving circuit 21 sets the voltage between the lower display electrode 11 and the common electrode 18 to zero, that is, sets the lower display electrode 11 and the common electrode 18 to an equipotential. Since no voltage is applied to the entire character pattern, the entire character pattern can be set in the scattering state.

Figure 7:
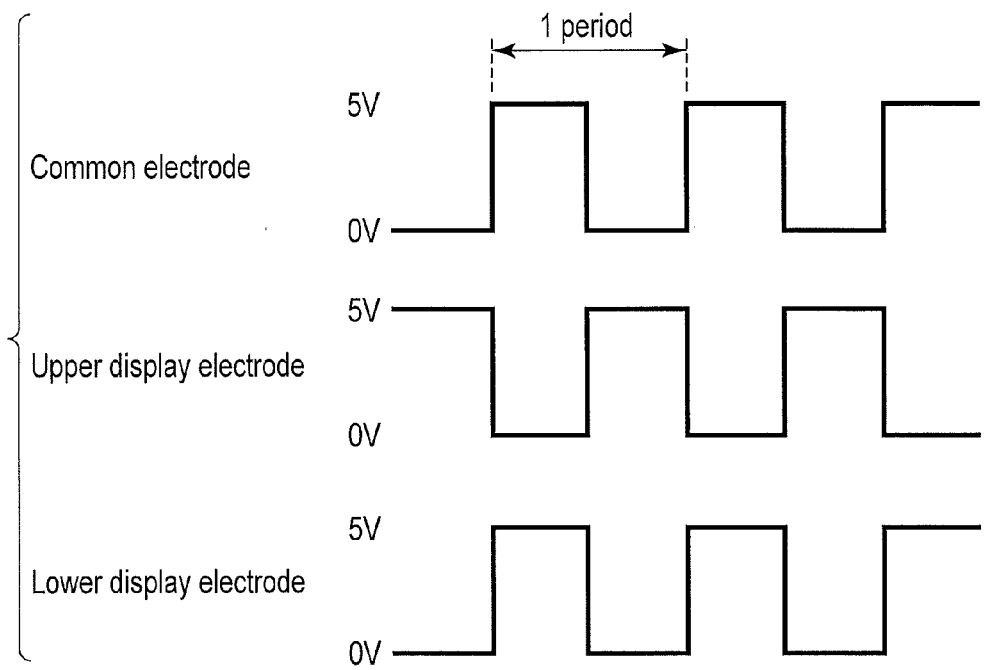
FIG. 7 is a timing chart showing voltage waveforms in weak scattering state 1 of the polymer-dispersed liquid crystal layer.

FIG. 7 shows voltage waveforms in the weak scattering state 1. In the weak scattering state 1, the driving circuit 22 applies a voltage of 5 V between the upper display electrode 15 and the common electrode 18. The driving circuit 21 sets the voltage between the lower display electrode 11 and the common electrode 18 to zero. The voltage of 5 V is applied in the first region A1 of the character pattern, whereas no voltage is applied in the second region A2 of the character pattern. It is therefore possible to set the first region A1 in the transparent state and the second region A2 in the scattering state. Hence, first halftone by dithering can be displayed by the voltage control shown in FIG. 7.

Figure 8:
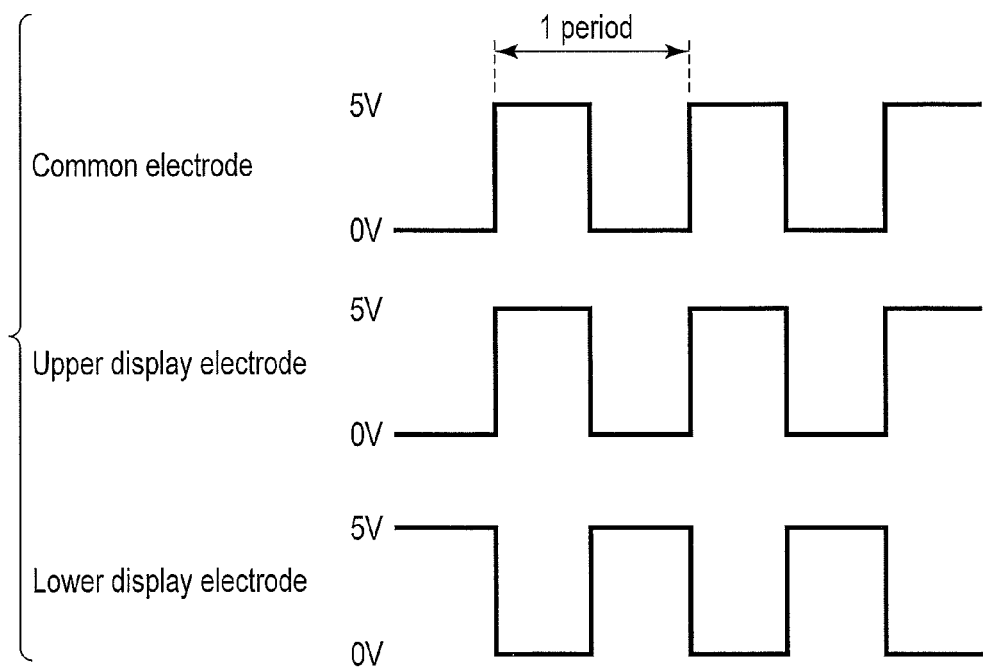
FIG. 8 is a timing chart showing voltage waveforms in weak scattering state 2 of the polymer-dispersed liquid crystal layer.

FIG. 8 shows voltage waveforms in the weak scattering state 2. In the weak scattering state 2, the driving circuit 22 sets the voltage between the upper display electrode 15 and the common electrode 18 to zero. The driving circuit 21 applies a voltage of 5 V between the lower display electrode 11 and the common electrode 18. No voltage is applied in the first region A1 of the character pattern, whereas the voltage of 5 V is applied in the second region A2 of the character pattern. It is therefore possible to set the first region A1 in the scattering state and the second region A2 in the transparent state. Hence, second halftone different from the first halftone can be displayed by the voltage control shown in FIG. 8.

Figure 9:
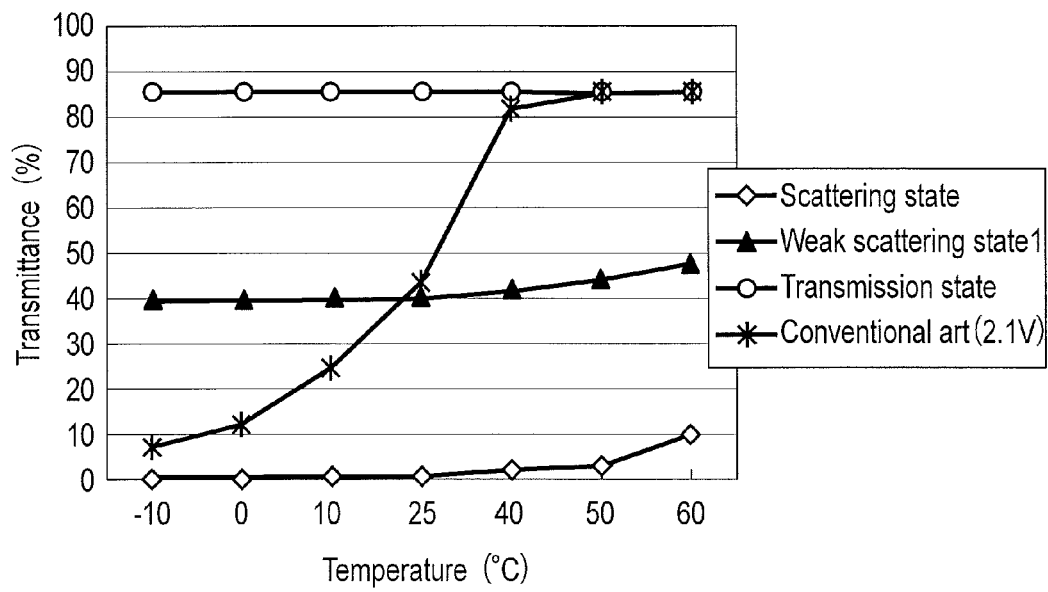
FIG. 9 is a graph showing the temperature dependence of the liquid crystal display.

FIG. 9 is a graph showing the temperature dependence of the liquid crystal display 1. The abscissa of FIG. 9 represents the temperature (° C.), and the ordinate represents the transmittance (%). FIG. 9 shows waveforms in the scattering state, the transparent state, and the weak scattering state 1 of this embodiment. For the sake of comparison, FIG. 9 also shows a waveform when halftone is displayed by applying an intermediate voltage (for example, 2.1 V) to the liquid crystal display of the conventional art.

In the conventional art, the transmittance of halftone largely changes depending on the temperature, as can be seen. Hence, the conventional art may be unable to display halftone depending on the temperature. In this embodiment, however, the transmittance is almost constant in each of the scattering state, the transparent state, and the weak scattering state 1. That is, in this embodiment, the temperature dependence can be made small in all display states.

Figure 10:
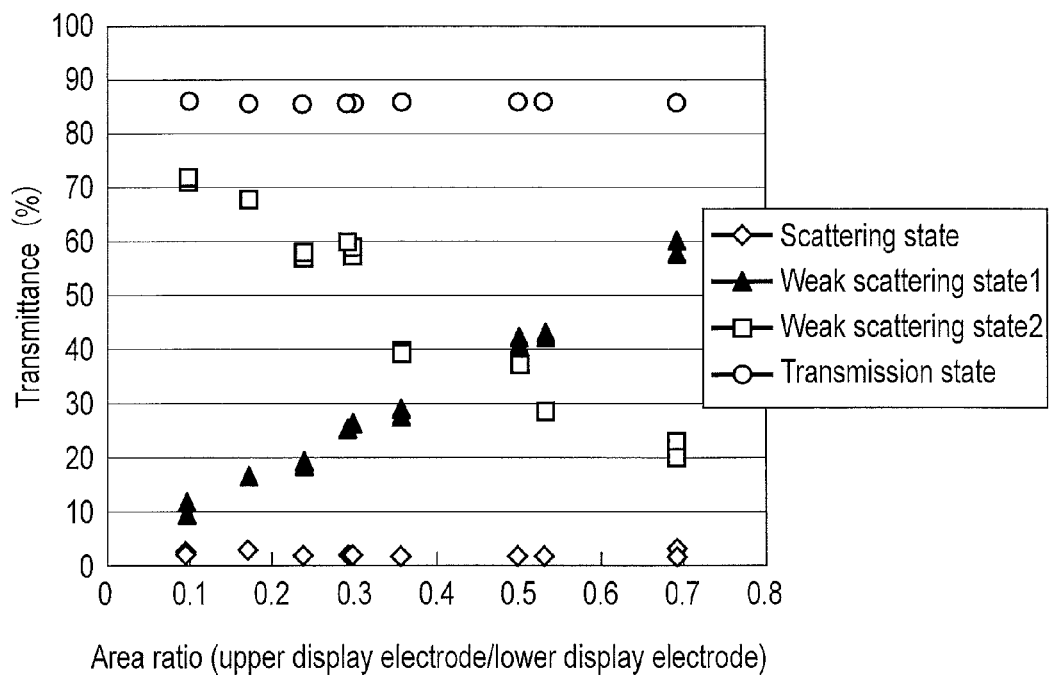
FIG. 10 is a graph showing the relationship between the transmittance and the area ratio of the upper display electrode to the lower display electrode.

Additionally, the transmittance of halftone in this embodiment can be controlled by changing the size of the opening portion formed in the upper display electrode 15 or the distance between the opening portions, that is, by changing the area ratio of the upper display electrode 15 to the lower display electrode 11. FIG. 10 is a graph showing the relationship between the transmittance and the area ratio of the upper display electrode 15 to the lower display electrode 11. FIG. 10 shows waveforms in the scattering state, the transparent state, the weak scattering state 1, and the weak scattering state 2 of this embodiment. The ordinate of FIG. 10 represents the transmittance (%), and the abscissa of FIG. 10 represents the area ratio of the upper display electrode 15 to the lower display electrode 11, that is, "area of upper display electrode 15/area of lower display electrode 11". The area of the lower display electrode 11 corresponds to the area of one character pattern.

In the scattering state and transparent state, almost constant transmittances can be maintained even when the area ratio changes. On the other hand, as can be understood from FIG. 10, the transmittance of halftone (weak scattering state 1 and weak scattering state 2) can arbitrarily be controlled by changing the area ratio. When the area ratio of the upper display electrode 15 to the lower display electrode 11 is appropriately set, and the voltage control shown in FIGS. 5, 6, 7, and 8 is performed, a character can be displayed in four different tones.

The condition of the opening portion 15A of the upper display electrode 15 will be described next. FIG. 11 is a view for explaining the relationship between the scattering appearance and the diameter of the opening portion 15A. When the diameter of the opening portion 15A is as small as 25 μm or less, light is diffracted and broken up to show a rainbow. Hence, the diameter of the opening portion 15A is preferably 25 μm or more. When the diameter of the opening portion 15A is as large as 100 μm or more, character display does not look even, and display becomes uneven because, for example, dots are visible. Hence, the diameter of the opening portion 15A is preferably 100 μm or less. To further improve the evenness of character display, the diameter of the opening portion 15A is preferably 50 μm or less.

FIG. 12 is a plan view showing one extracted character pattern. The character pattern is, for example, a square shown in FIG. 2. The square character pattern is expressed by the lower display electrode 11 and an upper display electrode 15-1, which have the same shape as the character pattern. The line width of the square is, for example, 120 μm. The upper display electrode 15-1 has a mesh pattern including opening portions each measuring, for example, 50 μm in diameter. The lower display electrode 11 is electrically connected to the driving circuit 21 via the lower interconnection electrode 12. The upper display electrode 15-1 is electrically connected to the driving circuit 22 via the contact plug 16 and the upper interconnection electrode 13.

An upper display electrode 15-2 without opening portions is provided in the region inside the square character pattern. An upper display electrode 15-3 without opening portions is provided in the region outside the square character pattern. The upper display electrodes 15-2 and 15-3 are electrically connected to each other by a jumper 30 and electrically connected to the driving circuit 22 via the jumper 30. The upper display electrodes 15-1 to 15-3 are electrically disconnected from each other by gaps GP.

The square character pattern can display four tones of transparent, first halftone, second halftone, and scattering. The regions inside and outside the square display only two tones of transparent and scattering because the upper display electrodes 15-2 and 15-3 have no opening portions.

Since the line of the square is as thin as about 120 µm, the opening portions of the upper display electrode 15-1 may break at the pattern edge of the square. The upper display electrode 15-1 does not exist in the region where the opening portion breaks. For this reason, alignment control of the polymer-dispersed liquid crystal layer 19 cannot be done by the upper display electrode 15-1, and the display of the pattern edge readily blurs. To suppress the display blur of the pattern edge, the upper display electrode 15-1 is preferably edged along the pattern edge of the square. That is, edging portions EG of the upper display electrode 15-1 are always provided along the pattern edge of the square. Since this can accurately display the tone of the pattern edge, the display blur of the pattern edge can be suppressed.

The reaction time until halftone is displayed will be explained next. In the normal nematic liquid crystal, the reaction time until the liquid crystal molecules are tilted by applying an intermediate voltage (for example, 2.1 V) is long. On the other hand, the reaction times from 0 to 5 V and from 5 to 0 V are short. For this reason, in the conventional art, the reaction time until the transparent state is changed to halftone by changing the voltage from 5 V to the intermediate voltage is as long as about 130 ms. Similarly, in the conventional art, the reaction time until the scattering state is changed to halftone by changing the voltage from zero to the intermediate voltage is as long as about 150 ms.

On the other hand, in this embodiment, no intermediate voltage is used to display halftone. For this reason, in this embodiment, the reaction time until the transparent state is changed to halftone is as short as about 15 ms. Similarly, in this embodiment, the reaction time until the scattering state is changed to halftone is as short as about 40 ms. In this embodiment, the reaction time until halftone display can thus be shortened as compared to the conventional art.

(Effects)

As described above in detail, in the liquid crystal display 1 according to the first embodiment, the substrate 17 on which the common electrode 18 is formed and the substrate 10 on which the lower display electrode 11 and the upper display electrode 15 are formed sandwich the polymer-dispersed liquid crystal layer 19. The lower display electrode 11 and the upper display electrode 15 are isolated from each other by the insulating layer 14 and processed into the same shape as a character pattern. The upper display electrode 15 has a mesh pattern including the plurality of opening portions 15A. The driving circuit 21 controls the voltage between the lower display electrode 11 and the common electrode 18, and the driving circuit 22 controls the voltage between the upper display electrode 15 and the common electrode 18, thereby displaying four tones of transparent, halftone (weak scattering 1 and weak scattering 2), and scattering states.

Hence, according to the first embodiment, halftone display can be done using dithering without using the intermediate voltage between zero and a high voltage (5 V). It is therefore possible to display halftone in a wide temperature range. It is also possible to shorten the reaction time until halftone is displayed.

Since the polymer-dispersed liquid crystal layer 19 is used as the liquid crystal, a plurality of tones can be expressed without using a polarizing plate or an alignment film. This makes it possible to implement a liquid crystal display 1 capable of reducing the manufacturing cost and being microfabricated.

Since the opening portions 15A of the upper display electrode 15 has a staggered arrangement, the upper display electrode 15 has an even mesh pattern. This can suppress halftone display unevenness.

Since the upper display electrode 15 is edged along the character pattern edge, the pattern edge can clearly be displayed.

Second Embodiment

Figure 13:
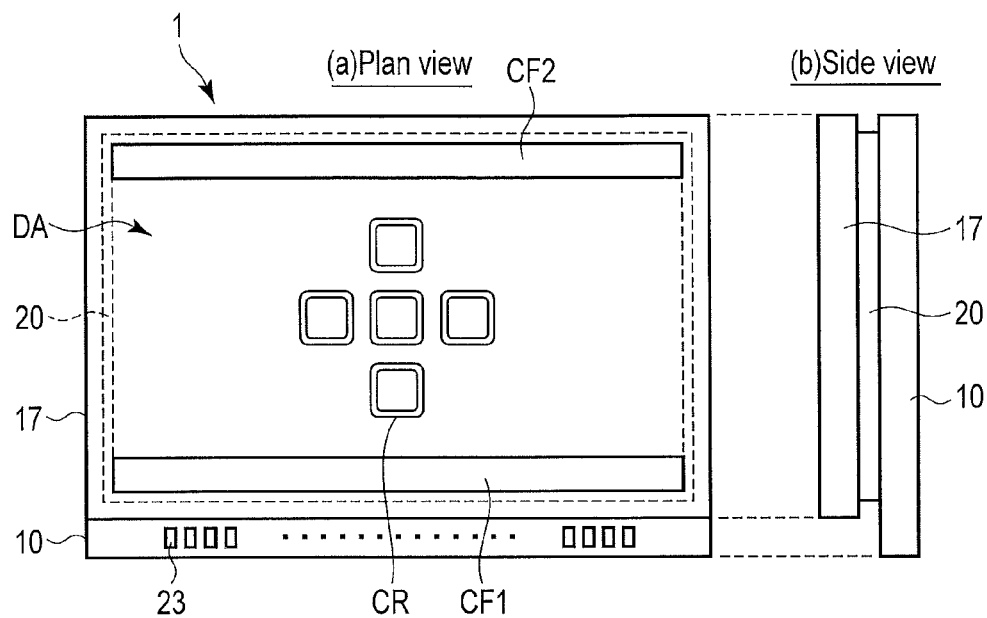
FIG. 13 shows schematic views of an example of characters displayable by a liquid crystal display according to the second embodiment.

FIG. 13 shows schematic views of an example of characters displayable by a liquid crystal display 1 according to the second embodiment. In FIG. 13, (a) is a plan view, and (b) is a side view. The region surrounded by a seal member 20 serves as a display region DA of the liquid crystal display 1. A polymer-dispersed liquid crystal layer 19 is provided in the display region DA. A common electrode 18 has a size equal to or larger than that of the display region DA. A plurality of square patterns in the display region DA are a plurality of characters CR displayable by the liquid crystal display 1. In addition, the display region DA is provided with, for example, crop frames CF1 and CF2. The crop frames are used to change the size of an image. The aspect ratio of a displayed image can be changed by partially masking the display region by the crop frames. The shapes and positions of the crop frames can arbitrarily be set.

Display of the characters and the crop frames can be turned on/off by controlling the voltage of the polymer-dispersed liquid crystal layer 19. A lower display electrode 11 and an upper display electrode 15 are processed into the same shape as the character CR or crop frame CF1 or CF2. As in FIG. 1, a lower interconnection electrode 12, an upper interconnection electrode 13, and the common electrode 18 are led to terminals 23. The plurality of terminals 23 are electrically connected to driving circuits 21 and 22.

Figure 14:
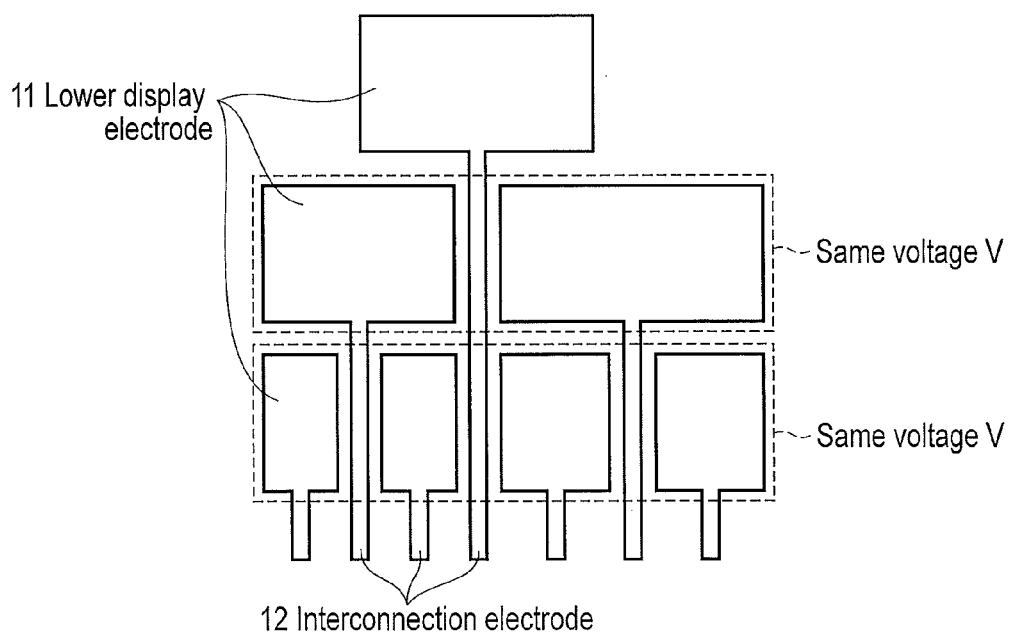
FIG. 14 is a plan view for explaining a lower display electrode divided by interconnection electrodes.

When leading the interconnection electrode of a character CR to the terminal 23, the interconnection electrode crosses crop frame CF1. The lower display electrode of crop frame CF1 is controlled by a single voltage. However, if crop frame CF1 is divided halfway, interconnections need to be connected to both the divided lower display electrodes. FIG. 14 shows the lower display electrode 11 divided by the interconnection electrodes 12. As shown in FIG. 14, since the lower display electrode 11 to be controlled by a single voltage V is divided into a plurality of parts by the interconnection electrodes 12, each of the divided lower display electrodes 11 needs to be provided with the interconnection electrode 12. For this reason, the number of interconnection electrodes 12 increases. The same situation as in FIG. 14 occurs not only for the crop frame but also for the characters adjacent in the vertical direction of the plan view in (a) of FIG. 13.

In the second embodiment, the plurality of lower display electrodes to be controlled by the same voltage (the plurality of lower display electrodes divided by the interconnection electrodes) are electrically connected using interconnections of the same level as the upper display electrode. The number of interconnection electrodes is decreased without decreasing the display quality.

Figure 15:
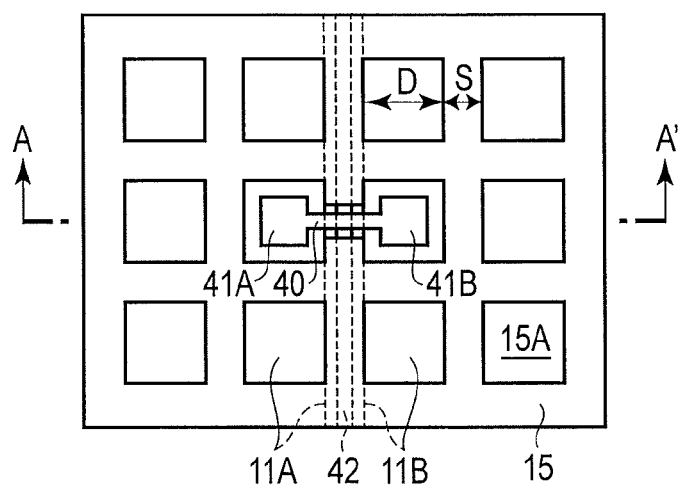
FIG. 15 is a plan view showing the arrangement of the liquid crystal display according to the second embodiment.
Figure 16:
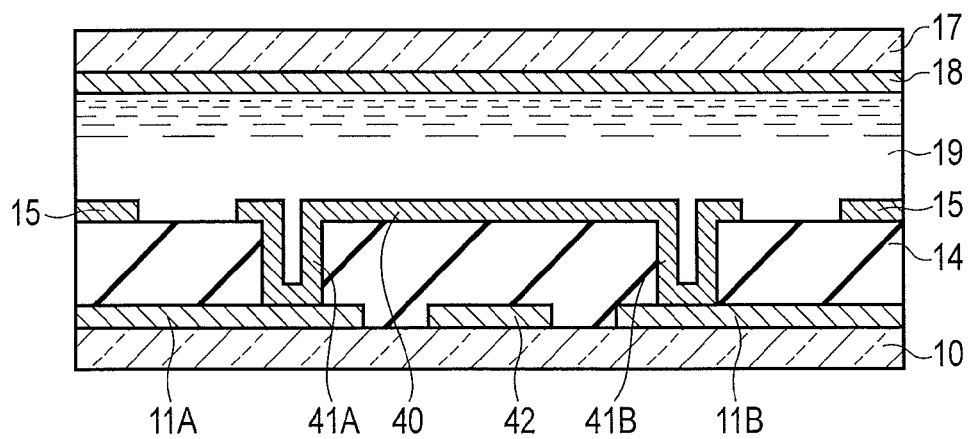
FIG. 16 is a sectional view showing the arrangement of the liquid crystal display taken along line A-A' in FIG. 15.
Figure 20:
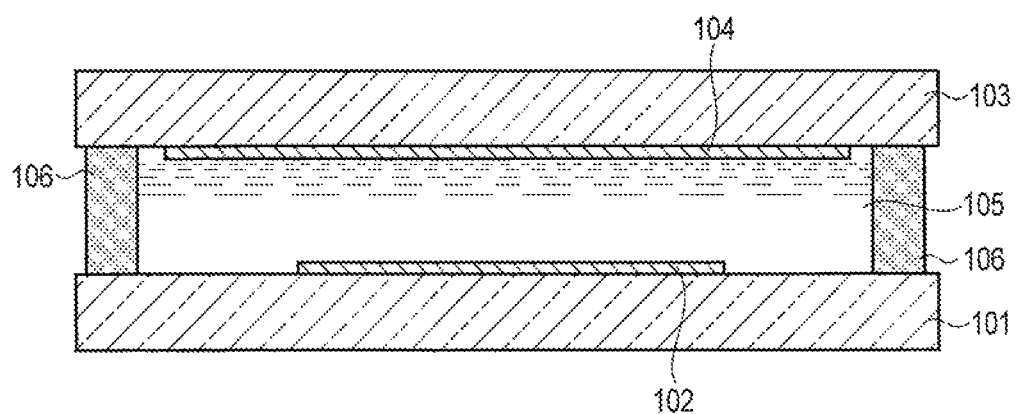
FIG. 20 is a sectional view showing an example of a conventional liquid crystal display.
Figure 21:
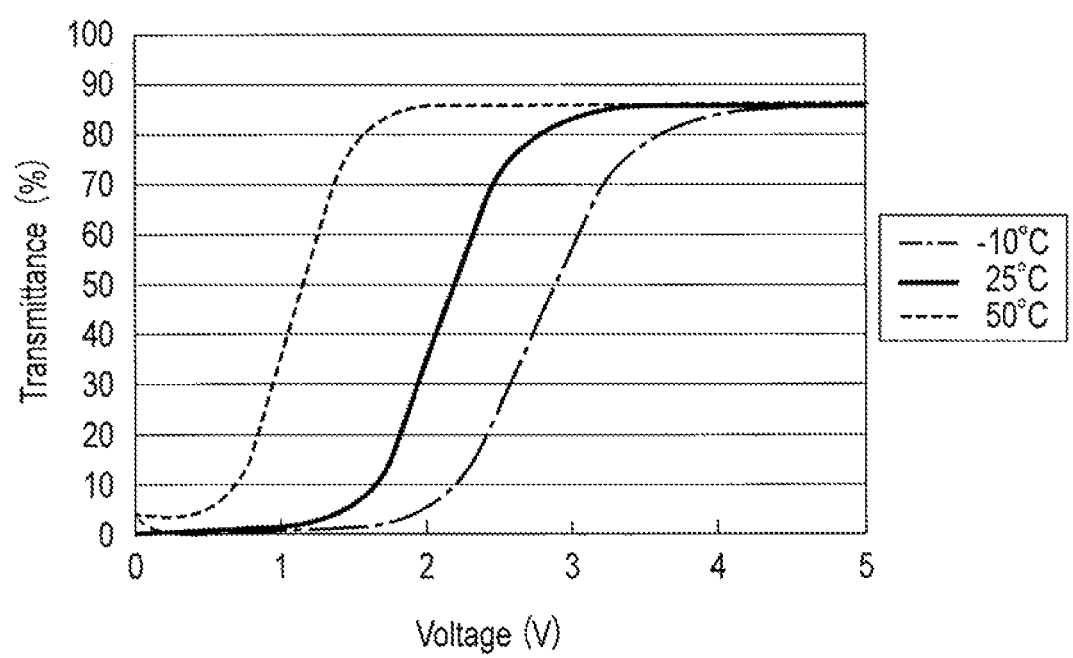
FIG. 21 is a graph for explaining the temperature dependence of the conventional liquid crystal display.

FIG. 15 is a plan view showing the arrangement of the liquid crystal display 1 according to the second embodiment. FIG. 16 is a sectional view showing the arrangement of the liquid crystal display 1 taken along line A-A' in FIG. 15. Note that FIGS. 15 and 16 extract part of a character or a crop frame whose lower display electrode is divided by an interconnection electrode 42. The interconnection electrode 42 corresponds to one of the lower interconnection electrode and the upper interconnection electrode of a character (or crop frame) different from the character (or crop frame) whose lower display electrode is divided by the interconnection electrode 42.

The lower display electrode 11 that forms one character (or crop frame) is divided into lower display electrodes 11A and 11B by the interconnection electrode 42. That is, the interconnection electrode 42 and the lower display electrode 11A are electrically disconnected, and the interconnection electrode 42 and the lower display electrode 11B are electrically disconnected.

The upper display electrode 15 is provided on an insulating layer 14. The upper display electrode 15 has a mesh pattern including a plurality of opening portions 15A. The opening portion 15A has, for example, a square shape. A length D of each side of the opening portion 15A is, for example, about 50 μm. That is, the upper display electrode 15 has a mesh pattern including the plurality of opening portions 15A each measuring 50 μm per side. In this specification, the length D of each side of the square opening portion 15A is synonymous with the diameter D of the circular opening portion 15A. When the length D of each side of the opening portion 15A is as large as 100 μm or more, character display does not look even, and display becomes uneven because, for example, dots are visible. Hence, the length D of each side of the opening portion 15A is preferably 100 μm or less. To further improve the evenness of character display, the length D of each side of the opening portion 15A is preferably 50 μm or less.

The width of the interconnection electrode 42 is set to be equal to or smaller than a distance S between the opening portions and is, for example, 3 μm. As shown in FIG. 15, the upper display electrode 15 is arranged above the interconnection electrode 42. That is, the upper display electrode 15 is formed to cover the interconnection electrode 42. This allows the upper display electrode 15 to hide the interconnection electrode 42 whose voltage is different from that of the lower display electrodes 11A and 11B. Since the electric field generated by the voltage of the interconnection electrode 42 is not applied to the polymer-dispersed liquid crystal layer 19, the display quality can be prevented from decreasing because of the interconnection electrode 42.

A conducting interconnection 40 is provided on the insulating layer 14 so as to extend in a direction perpendicular to the interconnection electrode 42 and cross the interconnection electrode 42. The width of the conducting interconnection 40 is set, for example, to be equal to or smaller than the length D of each side of the opening portion 15A of the upper display electrode 15 and is, for example, 3 μm. The conducting interconnection 40 is arranged at the same level as the upper display electrode 15 and made of the same interconnection layer and the same material as those of the upper display electrode 15.

One end of the conducting interconnection 40 and the lower display electrode 11A are electrically connected by a contact plug 41A passing through the insulating layer 14. The other end of the conducting interconnection 40 and the lower display electrode 11B are electrically connected by a contact plug 41B passing through the insulating layer 14. The contact plugs 41A and 41B are arranged in the opening portions 15A of the upper display electrode 15, respectively. The lower display electrodes 11A and 11B are electrically connected to each other by the conducting interconnection 40 and the contact plugs 41A and 41B. The contact plugs 41A and 41B are formed from transparent electrodes and made of, for example, ITO.

As described above, the contact plugs 41A and 41B are arranged in the opening portions 15A of the upper display electrode 15, respectively. The lower display electrodes 11A and 11B divided by the interconnection electrode 42 are electrically connected using the conducting interconnection 40. This can drive the divided lower display electrodes 11A and 11B as one electrode. As in the first embodiment, the voltages of the lower display electrode 11, the upper display electrode 15, and the common electrode 18 are controlled using the driving circuits 21 and 22, thereby expressing four different tones of transparent, halftone (weak scattering 1 and weak scattering 2), and scattering.

FIG. 17 is a schematic view showing the display state of the liquid crystal display 1 shown in FIG. 15. For example, assume that the region of the upper display electrode 15 is a scattering state, and the region of the lower display electrode 11 is a transparent state. The center of FIG. 17 corresponds to the region where the conducting interconnection 40 and the contact plugs 41A and 41B are arranged. The same voltage as in the lower display electrode 11 is applied to the conducting interconnection 40 and the contact plugs 41A and 41B. It is possible to decrease the number of interconnection electrodes (upper interconnection electrodes and lower interconnection electrodes) while suppressing a degradation in display quality. Note that since the conducting interconnection 40 is preferably invisible to the observer from the viewpoint of display quality, the conducting interconnection 40 is preferably thinner. Hence, the width of the conducting interconnection 40 is preferably 50 μm or less. In addition, since the upper display electrode 15 is formed to cover the conducting interconnection 40, the display quality can be prevented from decreasing because of the conducting interconnection 40.

(Effects)

As described above in detail, in the second embodiment, the lower display electrode used to display a first character is divided by the interconnection electrode 42 used to display a second character so as to include the lower display electrodes 11A and 11B. The insulating layer 14 is provided on the lower display electrodes 11A and 11B. The upper display electrode 15 is provided on the insulating layer 14. The lower display electrodes 11A and 11B are electrically connected by the conducting interconnection 40 provided on the insulating layer 14 and the contact plugs 41A and 41B connected to the two ends of the conducting interconnection 40.

Hence, according to the second embodiment, it is unnecessary to connect an interconnection electrode to each of the lower display electrodes 11A and 11B used to display one character. One interconnection electrode need only be connected to the lower display electrodes 11A and 11B. The number of interconnection electrodes connected to the lower display electrodes used to display one character can thus be decreased.

Since the number of interconnection electrodes can be decreased, the lower display electrode used to display one character is not finely divided. This makes it possible to facilitate the design and formation processes of the lower display electrodes and reduce the manufacturing cost of the liquid crystal display 1.

The upper display electrode 15 is formed to cover the interconnection electrode 42. Since the electric field generated by the voltage of the interconnection electrode 42 is not applied to the polymer-dispersed liquid crystal layer 19, the display quality can be prevented from decreasing because of the interconnection electrode 42.

The contact plugs 41A and 41B are arranged in the opening portions 15A of the upper display electrode 15, respectively. Since this can suppress the mesh pattern of the upper display electrode 15 from being distorted, a degradation in display quality can be suppressed. The remaining effects are the same as in the first embodiment.

Third Embodiment

When forming the lower display electrode and the interconnection electrode to lead the lower display electrode (or upper display electrode) by interconnection layers of the same level, if the interconnection electrode crosses an opening portion of the upper display electrode, the desired voltage cannot be applied to the region of the opening portion. Hence, to obtain a desired display pattern, the interconnection electrode is preferably covered by the upper display electrode, as described in the second embodiment. However, the upper display electrode needs to have an interconnection width to cover the interconnection electrode. Hence, the interconnection width of the upper display electrode is controlled by the area ratio of the upper display electrode and the opening portion, and it is difficult to form a mesh pattern whose each opening portion has a small area. On the other hand, when the area of each opening portion of the mesh pattern and the interconnection width of the upper display electrode are made large to cause the upper display electrode to cover the interconnection electrode, the pattern (dot) is visible, and the character cannot evenly be displayed.

In the third embodiment, the interconnection electrode to lead the lower display electrode (or upper display electrode) is formed by an interconnection layer of a level different from that of the lower display electrode. This makes it possible to freely design the pattern of the upper display electrode and prevent the display quality from degrading.

FIG. 18 is a plan view showing the arrangement of a liquid crystal display 1 according to the third embodiment. FIG. 19 is a sectional view showing the arrangement of the liquid crystal display 1 taken along line A-A' in FIG. 18.

A lower interconnection electrode 12 used to electrically connect a lower display electrode 11 and a terminal 23 (not shown), an upper interconnection electrode 13 used to electrically connect an upper display electrode 15 and the terminal 23 (not shown), and an interconnection electrode 42 are provided on the upper surface (liquid crystal-side surface) of a substrate 10. The interconnection electrode 42 corresponds to one of the lower interconnection electrode and the upper interconnection electrode of a character (or crop frame) different from a character (or crop frame) formed from the lower display electrode 11 and the upper display electrode 15 shown in FIG. 19. The lower interconnection electrode 12, the upper interconnection electrode 13, and the interconnection electrode 42 are formed from transparent electrodes and made of, for example, ITO.

An insulating layer 43 is provided on the upper surface of the substrate 10 so as to cover the lower interconnection electrode 12, the upper interconnection electrode 13, and the interconnection electrode 42. As the insulating layer 43, for example, silicon nitride is used. The film thickness of the insulating layer 43 is about 500 nm. The lower display electrode 11 is provided on the insulating layer 43. One terminal of the lower display electrode 11 and the lower interconnection electrode 12 are electrically connected by a contact plug 12A passing through the insulating layer 43. Contact plug 12A is formed from a transparent electrode and made of, for example, ITO.

An insulating layer 14 is provided on the insulating layer 43 so as to cover the lower display electrode 11. The upper display electrode 15 is provided on the insulating layer 14. The upper display electrode 15 has a mesh pattern including a plurality of opening portions 15A. One terminal of the upper display electrode 15 is electrically connected to the upper interconnection electrode 13 by a contact plug 16A, an electrode 16B, and a contact plug 16C. Contact plug 16A is provided in the insulating layer 14. The electrode 16B is formed from an interconnection layer of the same level as the lower display electrode 11. Contact plug 16C is provided in the insulating layer 43. Contact plug 16A, the electrode 16B, and contact plug 16C are formed from transparent electrodes and made of, for example, ITO. The arrangement above the upper display electrode 15 is the same as in the first embodiment.

The lower interconnection electrode 12 and a common electrode 18 are electrically connected to a driving circuit 22 via the terminals 23. The upper interconnection electrode 13 and the common electrode 18 are electrically connected to a driving circuit 21 via the terminals 23. The operations of the driving circuits 21 and 22 are the same as in the first embodiment.

When the interconnection electrode 42 is formed from the interconnection layer below the lower display electrode 11, the interconnection electrode 42 can freely be arranged, and the mesh pattern of the upper display electrode 15 can freely be designed without any constraint of the interconnection width and position of the interconnection electrode 42. The smaller the diameter of the opening portion 15A of the upper display electrode 15 is, the evener the character display looks. Hence, in the third embodiment, the diameter of the opening portion 15A of the upper display electrode 15 is set to 100 μm or less and, more preferably, to 50 μm or less.

For example, if the refractive index difference between the insulating layer 14 and the lower display electrode 11 is large, the lower display electrode 11 may be visible from the screen. To prevent this, the refractive index difference between the insulating layer 14 and the lower display electrode 11 and the refractive index difference between the lower display electrode 11 and the insulating layer 43 are preferably smaller and, more specifically, 0.25 or less. For the same reason, the refractive index difference between the insulating layer 14 and the upper display electrode 15 is preferably 0.25 or less. The lower display electrode 11 and the upper display electrode 15 can be prevented from being visible from the screen by satisfying the refractive index condition.

The interconnection electrode 42 is formed to be small in the interconnection width. For this reason, when ITO is used for the interconnection electrode 42, the interconnection electrode 42 is rarely visible. However, if the interconnection width of the interconnection electrode 42 increases, the interconnection electrode 42 may be visible depending on the refractive index difference between the interconnection electrode 42 and the insulating layer 43. Hence, the refractive index difference between the interconnection electrode 42 and the insulating layer 43 is also preferably 0.25 or less.

(Effects)

As described above in detail, in the third embodiment, the interconnection electrode 42 used to display a first character is provided on the substrate 10. The lower display electrode 11 and the upper display electrode 15 used to display a second character are provided above the insulating layer 43 on the interconnection electrode 42.

Hence, according to the third embodiment, since the lower display electrode 11 used to display one character is not divided by the interconnection electrode 42, the number of interconnection electrodes can be decreased. This makes it possible to facilitate the design and formation processes of the lower display electrode 11 and reduce the manufacturing cost of the liquid crystal display 1.

The interconnection electrode 42 need not be covered by the upper display electrode 15, unlike the second embodiment. It is therefore possible to freely design the mesh pattern of the upper display electrode 15. More specifically, the area of each opening portion 15A of the upper display electrode 15 can be made small, or the shape of the opening portion 15A can freely be designed. It is consequently possible to reduce the halftone display unevenness.

Since the interconnection electrode 42 can be covered by the lower display electrode 11, the electric field generated by the voltage of the interconnection electrode 42 is not applied to the polymer-dispersed liquid crystal layer 19. For this reason, the display quality can be prevented from decreasing because of the interconnection electrode 42. The remaining effects are the same as in the first embodiment.

The liquid crystal display of each of the above-described embodiments is applicable to a pattern display type liquid crystal display that displays a letter or a graphic pattern on the viewfinder of a camera or the like in a superimposed manner. The liquid crystal display is also applicable to a digital clock, switchable light control glass, a liquid crystal display capable of segment display, a liquid crystal display capable of matrix display, and the like.

The present invention is not limited to the embodiments described above, and can be embodied by modifying constituent elements without departing from the gist of the invention. In addition, the above embodiments include inventions of various stages, and various inventions can be formed by proper combinations of a plurality of constituent elements disclosed in one embodiment or proper combinations of constituent elements disclosed in different embodiments. When, for example, the problems to be solved by the present invention can be solved and the effects of the invention can be obtained even if several constituent elements are omitted from all the constituent elements disclosed in each embodiment, an embodiment from which these constituent elements are omitted can be extracted as an invention.

What is claimed is:

1. A liquid crystal display comprising:
   a first substrate and a second substrate;
   a first interconnection provided on the first substrate, configured to display a first character, and extending in a first direction;
   a first insulating layer provided on the interconnection and the first substrate;
   a first lower display electrode provided on the first insulating layer and configured to display a second character;
   a second insulating layer provided on the first lower display electrode and the first insulating layer;
   a first upper display electrode provided on the second insulating layer and including opening portions;
   a common electrode provided on the second substrate; and
   a polymer-dispersed liquid crystal layer sandwiched between the first substrate and the second substrate in a state in which the first upper display electrode and the common electrode face each other,
   wherein the first interconnection overlaps the first lower display electrode via the first insulating layer in a plan view.

2. The display of claim 1, wherein a diameter of each of the opening portions is not more than 100 μm.

3. The display of claim 1, wherein a refractive index difference between the first insulating layer and the first lower display electrode, the refractive index difference between the first lower display electrode and the second insulating layer, and the refractive index difference between the second insulating layer and the first upper display electrode are not more than 0.25.

4. The display of claim 1, further comprising:
   a first driving circuit configured to apply a first voltage between the common electrode and the first lower display electrode; and
   a second driving circuit configured to apply a second voltage between the common electrode and the first upper display electrode.

5. The display of claim 4, wherein each of the first voltage and the second voltage includes voltages of two levels.

6. The display of claim 1, wherein the opening portions have a staggered arrangement.

7. The display of claim 1, wherein a width of the interconnection is not more than 50 μm.

8. The display of claim 1, wherein
   each of the first lower display electrode and the first upper display electrode has the same shape as the second character, and
   the first upper display electrode includes an edging portion provided along an edge of the second character.

9. The display of claim 1, wherein the first lower display electrode has a planer shape, and overlaps the opening portions in the plan view.

10. The display of claim 1, wherein each of the opening portions has a circular shape, an elliptical shape or a square shape.

11. The display of claim 1, further comprising:
    a second interconnection provided on the first substrate and electrically connected to the first lower display electrode; and
    a third interconnection provided on the first substrate and electrically connected to the first upper display electrode.

12. The display of claim 11, further comprising:
    a first contact plug connecting the second interconnection to the first lower display electrode; and
    a second contact plug connecting the third interconnetion to the first upper display electrode.

13. The display of claim 11, wherein
    the second interconnection overlaps the first lower display electrode, and
    the third interconnection overlaps the first upper display electrode.

14. The display of claim 1, wherein the first interconnection is electrically connected to one of a second lower display electrode and a second upper display electrode for the first character.

15. The display of claim 1, further comprising a driving circuit, wherein
    the driving circuit applies a first voltage to the common electrode and the first lower display electrode, and applies a second voltage higher than the first voltage to the first upper display electrode in a first display mode, and
    the driving circuit applies the first voltage to the common electrode and the first upper display electrode, and applies the second voltage to the first lower display electrode in a second display mode.

* * * * *

UNITED STATES PATENT AND TRADEMARK OFFICE
CERTIFICATE OF CORRECTION

| | | |
|---|---|---|
| PATENT NO. | : 9,625,755 B2 | Page 1 of 1 |
| APPLICATION NO. | : 13/964605 | |
| DATED | : April 18, 2017 | |
| INVENTOR(S) | : Norishige Iwanami et al. | |

It is certified that error appears in the above-identified patent and that said Letters Patent is hereby corrected as shown below:

On the Title Page

Column 2, item (56) (Other Publications), Line 3:
Delete "Defnition" and insert --Definition--, therefor.

In the Claims

Column 16, Line 47 (Claim 12, Line 4):
Delete "interconnetion" and insert --interconnection--, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*